Nov. 20, 1962 CHUKO ITO ETAL 3,065,045
PROCESS FOR THE PRODUCTION OF URANIUM TETRAFLUORIDE
FROM URANIUM RAW MATERIAL
Filed Aug. 11, 1958

*Fig. 1.*

Diagram (I)

Uranium Raw Material
↓
Dissolution and Leaching ← Sulphuric Acid
↓
Classification → Waste Sludge → Discard
↓
Thickening → Waste Sludge → Discard
↓
Reduction of Ferric Iron
↓
Extraction by Organic Solvent
↓
Sodium Carbonate Solution → Stripping ← Sulphuric Acid
↓
Electrolytic Reduction
a Part
↓
Precipitation by HF ← Hydrogen Fluoride Solution
↓
Filtration
↓
Drying
↓
Uranium Tetrafluoride

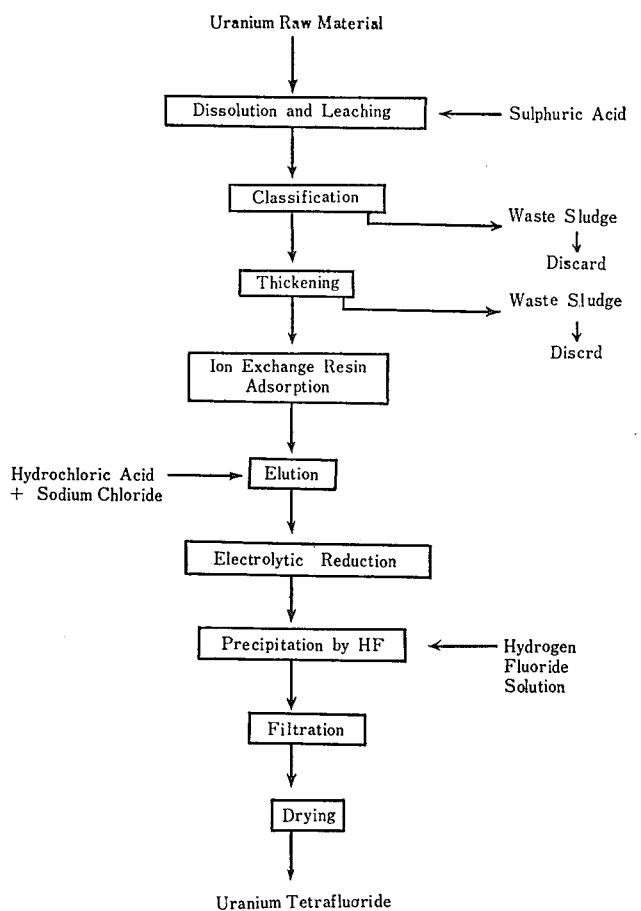

3,065,045
PROCESS FOR THE PRODUCTION OF URANIUM TETRAFLUORIDE FROM URANIUM RAW MATERIAL
Chuko Ito, Setagaya-ku, Tokyo-to, Takeo Okuda, Suginami-ku, Tokyo-to, and Naohiko Hamabe, Omiya-shi, Saitama-ken, Japan, assignors to Mitsubishi Kinzoku Kogyo Kabushiki Kaisha, Tokyo-to, Japan
Filed Aug. 11, 1958, Ser. No. 754,286
Claims priority, application Japan Jan. 11, 1958
1 Claim. (Cl. 23—14.5)

This invention relates to a process for the production of uranium tetrafluoride from uranium raw material.

Heretofore, in a conventional process of producing uranium tetrafluoride, the following steps are successively carried out. The uranium raw material is dissolved and leached by use of sulphuric acid, said leach liquor is filtered or removed of sand, said extract is extracted and concentrated by an ion exchange resin process or by an extraction process using an organic solvent, the uranium contained in said concentrated extract is made to precipitate by use of a precipitant such as ammonium or magnesium oxide, and said precipitate is filtered and dried to produce the so-called yellow cake. This cake is again dissolved in nitric acid and refined by an extraction process using an organic solvent to obtain an uranyl nitrate solution. This solution is subjected to a heating to distillate the solvent and to effect the denitration and decomposition for producing uranium trioxide ($UO_3$).

This oxide is subjected to a further reduction by hydrogen to produce uranium dioxide ($UO_2$). Finally, hydrogen fluoride gas is passed through said uranium dioxide to produce uranium tetrafluoride. Such a conventional process as described above involves many difficulties, because it necessitates many steps, requires complicated installations for effecting drying treatment such as de-nitration, reduction by hydrogen, fluorination etc., and requires a particular precaution with respect to corrosion of the apparatus.

Although many attempts were made to overcome the foregoing difficulties and other difficulties, none, as far as we are aware, was entirely successful when carried into practice commercially on an industrial scale. It has now been discovered that uranium tetrafluoride can be produced from uranium raw material without accompaniment of the disadvantages of the conventional process described above.

It is an object of the present invention to provide a process for the production of uranium tetrafluoride from uranium raw material.

Another object of the invention is to provide a simple process for the production of uranium tetrafluoride.

Other objects and advantages will become apparent from the following detailed explanation taken in connection with the accompanying drawings, wherein;

FIG. 1 is a block diagram showing one embodiment of this invention.

FIG. 2 depicts a block diagram showing a well known process, wherein uranium tetrafluoride is produced by combination of ion exchange resin process and electrolytic reduction.

Generally speaking, the present invention contemplates the steps of dissolving and leaching uranium raw material with sulphuric acid, adding a tetra-valent uranium solution obtained by electrolytic reduction to said leach, subjecting said leach exuded by sulphuric acid to an extraction with an organic solvent to refine and concentrate uranium, converting said extract to an uranous solution of tetra-valent by electrolytic reduction, and reacting hydrogen fluoride with said uranous solution to produce uranium tetrafluoride.

In carrying the invention into practice, as shown by the block diagram of FIG. 1, uranium ore is first dissolved and leached by sulphuric acid, and then classified to separate liquid from sludge. To the liquid is added a portion of the tetra-valent uranous sulphate liquid which is obtained by a later electrolytic reduction to convert the ferric iron ions to ferrous iron ions by reduction, and thereafter an organic solvent is added for the extraction of the uranium. The organic solvent phase from which the uranium has been extracted is separated from the aqueous raffinate phase, and then to said organic solvent phase is added and mixed sodium carbonate for stripping. Then, uranium is converted to aqueous uranyl carbonate. This liquid is acidified by the addition of sulphuric acid, and then, after being separated from carbon dioxide gas, is introduced into an electrolytic reduction bath. In this bath, uranium is converted to tetra-valent uranous ions from hexa-valent uranyl ions by reduction, whereby liquid uranous sulphate is produced. As stated above, a portion of this liquid is used for the reduction of ferric irons.

Aqueous hydrogen fluoride is added to the major portion of the liquid uranous sulphate to make uranium tetrafluoride precipitate. This uranium tetrafluoride is then filtered, washed and dried. The dried uranium tetrafluoride may be used for the production of metallic uranium by reduction by use of a reducing agent such as metallic magnesium and the like.

As stated above, since all such steps of the process of this invention as dissolving of the raw material, refining, reduction and fluorination are carried out by sulphuric acid solution which constitutes the wet process, it is possible to simplify the complicated steps of the conventional process and moreover it does not require complicated steps such as de-nitration, reduction by hydrogen, and dry fluorination, all of said steps requiring cumbersome devices. More particularly, this process does not necessitate the use of any acid such as nitric acid, and hence the recovery operation of said acid is also unnecessary, thus resulting in reduction of the production cost.

As illustrated by the block diagram in FIG. 2, it is well known to produce uranium tetrafluoride by the combination of ion exchange resin process and electrolytic reduction process. This process, however, requires very complicated and costly ion exchange resin device which must be manipulated under difficult conditions. The uranium absorbed by the ion exchange resin is eluted by using a mixed solution of hydrochloric acid and sodium chloride and then subjected to an electrolytic reduction as a chloride of uranium. Therefore, the electrodes must be made of a special corrosion protective material, whereby the device is made very expensive. Moreover, according to the ion exchange resin process, the contained impurities such as iron ions are absorbed together with the uranium, so that there is such a disadvantage that it is very difficult to obtain uranium solution of high purity.

On the contrary, since in the present invention, the combination of the organic solvent extraction process and electrolytic reduction process are adopted, a very simple mixer-settler can be used as the device for the organic solvent extraction, the operation is easy and the installation becomes cheap. Furthermore, a solution of sulphuric acid is used throughout the reaction, thereby a special electrode is not required for the electrolytic reduction, but conventional lead electrodes may be used. Furthermore, since the ferric iron ions being impurities can be converted by reduction to the ferrous iron ions by means of the tetra-valent uranous solution obtained by the electrolytic reduction, as stated above, the deleterious effect caused by the ferric irons is eliminated, thereby producing uranium solution of high purity.

Such advantageous reduction of ferric iron ions as stated above is made possible by the combination of an electrolytic reduction of a solution acidified by sulphuric acid and an organic solvent extraction process. Therefore, the conventional reduction process utilizing metallic irons which have been ordinally used for reducing the ferric irons becomes unnecessary, thereby making it unnecessary to provide a particular iron reducing apparatus. Moreover, since the necessary uranous liquid for the reduction is supplied by a circulation of said liquid in a sufficient amount to reduce the iron, there is no loss of uranium.

For the purpose of giving those skilled in the art a better understanding of the invention (and/or a better appreciation of the advantages of the invention), the following illustrative examples are given:

Example I

Uranium raw material (containing 0.1% $U_3O_8$ and 1.6% $Fe_2O_3$) was dissolved in sulphuric acid and filtered to obtain the leached liquor of uranium of a pH of 1.0 and containing 0.58 g. of U and 1.31 g. of $Fe^{III}$ per liter. To this liquid was added tetra-valent uranous solution obtained by the later electrolytic reduction, in an amount sufficient to reduce the iron ions, and this mixture was agitated to convert $Fe^{III}$ to $Fe^{II}$. The solution thus obtained was introduced to an extraction device utilizing an organic solvent, in which said solution was mixed with an organic solvent (0.1 M di-2-ethylhexyl phosphoric acid and 3% tributyl phosphate in kerosene) to effect extraction. After said extraction, the liquid mixture was transferred into a settling tank where it was separated into an organic solvent phase containing 10 g. of uranium and 0.1 g. of irons per liter and an aqueous solution phase containing 0.001 g. of uranium and 1.2 g. of irons per liter.

Then, the organic solvent phase was introduced into a stripping device, in which said organic solvent phase was added with 10% sodium carbonate solution to effect the stripping. The liquid was then transferred into a settling tank to separate into an aqueous solution phase containing 50 g. of uranium and 0.01 g. of irons per liter and an organic solvent phase containing 0.03 g. of uranium and 0.1 g. of irons per liter. The organic solvent phase thus obtained was controlled in its contents of the solvent and again used for the extraction of uranium. The aqueous solution phase was acidified by sulphuric acid to expel carbon dioxide gas and then was subjected to a reduction. The chamber divided by an unglazed diaphragm into two compartments, each containing, respectively, a cathode and an anode made of lead, was used as the electrolytic cell. The temperature was maintained at 70° C. and the current density was adjusted to 8 a./dm.$^2$. When the concentration of the uranyl irons of hexa-valent had decreased to a trace, the electrolysis was stopped. The uranous solution obtained by the electrolytic reduction was then introduced into a precipitation tank where an excessive amount of aqueous hydrogen fluoride was added to form a precipitate of uranium tetrafluoride. The precipitate thus obtained was then filtered, washed and dried. The uranium tetrafluoride thus obtained contained more than 97% $UF_4$, 0.0005% Fe and 0.02% water.

Example II

Uranium raw material (containing 0.12% $U_3O_8$ and 1.5% $Fe_2O_3$) was dissolved in sulphuric acid and filtered to obtain a leached liquor of uranium of a pH of 0.8 and containing 0.85 g. of U and 0.4 g. of $Fe^{III}$ per liter. To this liquid was added tetra-valent uranous solution obtained by the later electrolytic reduction, in an amount sufficient to reduce the iron ions, and this mixture was agitated to convert $Fe^{III}$ to $Fe^{II}$. The solution thus obtained was introduced to an extraction device utilizing an organic solvent (0.2 M di-2-ethylhexyl phosphoric acid in kerosene) to effect the extraction. After said extraction, the liquid mixture was transferred into a settling tank where it was separated into an organic solvent phase containing 12 g. of uranium and 0.1 g. of irons per liter and an aqueous solution phase containing 0.001 g. of uranium and 2.5 g. of irons per liter. Then, the organic solvent phase was introduced into a stripping device, in which said organic solvent phase was added with 10 N sulphuric acid solution to effect the stripping. The liquid was then transferred into a settling tank to separate into an aqueous solution phase containing 40 g. of uranium and 0.01 g. of irons per liter and an organic solvent phase containing 0.03 g. of uranium and 0.2 g. of irons per liter. The contents of the solvent thus obtained in the organic solvent phase was controlled and used again for the extraction of uranium. The aqueous solution pregnant in uranium was subjected to a reduction. A chamber divided by an unglazed diaphragm into two compartments, each containing, respectively, a cathode and an anode made of lead, was used as the electrolytic cell. The temperature was maintained at 50° C. and the current density was adjusted to 5 a./dm.$^2$. When the concentration of the hexa-valent uranyl ions had decreased to a trace, the electrolysis was stopped. The uranous solution obtained by the electrolytic reduction was then introduced into a precipitation tank where an excessive amount of aqueous hydrogen fluoride was added to form a precipitate of uranium tetrafluoride. The precipitate thus obtained was then filtered, washed and dried. The uranium tetrafluoride thus obtained contained more than 98% $UF_4$, 0.0001% Fe and 0.02% water.

Example III

Uranium raw material (containing 0.05% of $U_3O_8$ and 1.0% $Fe_2O_3$) was dissolved in sulphuric acid and filtered to obtain a leached liquor of uranium of a pH of 0.8 and containing 0.55 g. of U and 0.3 g. of $Fe^{III}$ per liter. To this liquid was added tetra-valent uranous solution obtained by the later electrolytic reduction, in an amount sufficient to reduce the iron ions, and this mixture was agitated to convert $Fe^{III}$ to $Fe^{II}$. The solution thus obtained was introduced to an extraction device utilizing an organic solvent (0.1 M di-2-ethylhexyl phosphoric acid and 3% tributyl phosphate in kerosene) to effect the extraction. After said extraction, the liquid mixture was transferred into a settling tank where it was separated into an organic solvent phase containing 6 g. of uranium and 0.1 of irons per liter and an aqueous solution phase containing 0.001 g. of uranium and 1.5 g. of irons per liter. Then, the organic solvent phase was introduced into a stripping device, in which said organic solvent phase was added with 7% sodium carbonate solution to effect the stripping. The liquid was then transferred into a settling tank to separate into an aqueous solution phase containing 30 g. of uranium and 0.01 g. of irons per liter and an organic solvent phase containing 0.02 g. of uranium and 0.1 g. of irons per liter. The contents of the solvent thus obtained in the organic solvent phase was controlled and used again for the extraction of uranium.

The aqueous solution pregnant in uranium was acidified with sulphuric acid to destroy the carbonate, and was subjected to a reduction. A chamber divided by an unglazed diaphragm into two compartments, each containing, respectively, a cathode and an anode made of lead, was used as the electrolytic cell. The temperature was maintained at 40° C. and the current density was adjusted to 4 a./dm.$^2$. When the concentration of the hexa-valent uranyl ions had decreased to a trace, the electrolysis was stopped. The uranous solution obtained by the electrolytic reduction was then introduced into a precipitation tank where an excessive amount of aqueous hydrogen fluoride was added to form a precipitate of uranium tetrafluoride. The precipitate thus obtained was then filtered, washed and dried. The uranium tetrafluoride thus obtained contained more than 98% $UF_4$, 0.0001% Fe and 0.02% water.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

We claim:

In a process for the production of uranium tetrafluoride which comprises the steps of leaching a uranium containing raw material contaminated with iron and other impurities with sulphuric acid to obtain an aqueous leach liquor, containing the desired uranium values and undesired metallic contaminants both in solution; extracting the aqueous leach liquor with an organic liquid to separate the uranium values from a substantial portion of the contaminants; stripping the uranium values from the organic extract, with an aqueous stripping agent; treating the stripped, uranium-containing aqueous phase with sulphuric acid to obtain an aqueous uranyl sulfate solution; electrolytically reducing the aqueous sulfate solution to convert substantially all of the hexa-valent uranium ions therein to tetravalent uranium ions; and treating the resulting reduced uranous sulfate solution with hydrogen fluoride to precipitate the uranium tetrafluoride, the improvement which comprises: separating a portion of the electrolytically reduced solution from the main body of reduced uranous sulfate solution and adding said separated portion to the leach liquor, whereby the ferric iron in said leach liquor is reduced to ferrous iron by the tetravalent uranium in said uranous sulfate solution and the contamination of the subsequently extracted uranium-containing liquid is thereby diminished as compared to the contamination experienced when solid metallic reducing agents are employed to reduce the ferric iron to ferrous iron.

References Cited in the file of this patent

UNITED STATES PATENTS

| 2,769,686 | McCullough et al. | Nov. 6, 1956 |
| 2,900,229 | McClaine | Aug. 18, 1959 |

FOREIGN PATENTS

| 696,021 | Great Britain | Aug. 19, 1953 |

OTHER REFERENCES

AEC Document AECU–3181, April 1956, pp. 2, 3, 6 and 14.

Proceedings of the International Conference on the Peaceful Uses of Atomic Energy, August 8–20, 1955, vol. 8, pp. 8–12 and 71–76, United Nations, New York.